(12) United States Patent
Bingamon et al.

(10) Patent No.: US 7,527,688 B2
(45) Date of Patent: May 5, 2009

(54) CEMENTITIOUS COMPOSITIONS FOR OIL WELL CEMENTING APPLICATIONS

(75) Inventors: Arlen Earl Bingamon, Ada, OK (US); Stephen C. Morrical, Bozeman, MT (US); Francis Allison Innis, Novi, MI (US); Anthony Martin Sorcic, Spring, TX (US)

(73) Assignee: Holcim (US) Inc., Dundee, MI (US)

( * ) Notice: Subject to any disclaimer, the term of this patent is extended or adjusted under 35 U.S.C. 154(b) by 0 days.

(21) Appl. No.: 11/960,235

(22) Filed: Dec. 19, 2007

(65) Prior Publication Data

US 2008/0092780 A1    Apr. 24, 2008

Related U.S. Application Data

(62) Division of application No. 11/471,437, filed on Jun. 20, 2006, now Pat. No. 7,341,105.

(51) Int. Cl.
   *C04B 7/04*    (2006.01)
(52) U.S. Cl. ............... 106/713; 106/715; 106/724; 106/727; 106/738; 106/778; 106/823
(58) Field of Classification Search ................. 106/713, 106/715, 724, 727, 738, 778, 823
   See application file for complete search history.

(56) References Cited

U.S. PATENT DOCUMENTS

| | | | |
|---|---|---|---|
| 2,446,990 A | 8/1948 | Schuetz | |
| 3,556,222 A | 1/1971 | Lumpkin et al. | |
| 3,572,438 A | 3/1971 | Rohe | |
| 3,645,328 A | 2/1972 | Greene, Jr. | |
| 3,648,777 A | 3/1972 | Arterbury et al. | |
| 3,666,010 A | 5/1972 | Harris | |
| 3,676,363 A | 7/1972 | Mosier | |
| 3,749,163 A | 7/1973 | Waters | |
| 3,763,931 A | 10/1973 | Waters | |
| 3,768,562 A | 10/1973 | Baker | |
| 3,796,273 A | 3/1974 | Rininger | |
| 3,841,886 A | 10/1974 | Burr | |
| 3,842,905 A | 10/1974 | Morrisett et al. | |
| 3,856,540 A | 12/1974 | Mizunuma et al. | |

(Continued)

FOREIGN PATENT DOCUMENTS

EP    0 295 712    12/1988

(Continued)

OTHER PUBLICATIONS

"Designation: C 1157-03—Standard Performance Specification for Hydraulic Cement," ASTM International, 2003, pp. 1-6.

(Continued)

*Primary Examiner*—Paul Marcantoni
(74) *Attorney, Agent, or Firm*—Harness, Dickey & Pierce, P.L.C.

(57) ABSTRACT

Cementitious compositions are provided that can be use in drilling oil and gas well applications. The compositions include a source of hydraulically settable cement, calcium carbonate, free lime and alkali ions, calcium sulfate and an organic component. Methods for cementing a casing and liners and for remedial operations such as plugging back and squeeze cementing are also provided.

23 Claims, 4 Drawing Sheets

U.S. PATENT DOCUMENTS

| | | |
|---|---|---|
| 3,863,716 A | 2/1975 | Streich |
| 3,895,678 A | 7/1975 | Wright et al. |
| 3,913,686 A | 10/1975 | Manson, Jr. |
| 3,918,523 A | 11/1975 | Stuber |
| 3,939,927 A | 2/1976 | Bohn |
| 3,948,322 A | 4/1976 | Baker |
| 3,950,178 A | 4/1976 | Jaklin |
| 3,961,973 A | 6/1976 | Jones |
| 3,971,926 A | 7/1976 | Gau et al. |
| 3,982,590 A | 9/1976 | Harriman |
| 4,011,092 A | 3/1977 | Yue |
| 4,036,301 A | 7/1977 | Powers et al. |
| 4,040,852 A | 8/1977 | Jones |
| 4,063,301 A | 12/1977 | Lye |
| 4,064,941 A | 12/1977 | Smith |
| 4,069,870 A | 1/1978 | Gallus |
| 4,073,511 A | 2/1978 | Haas et al. |
| 4,098,613 A | 7/1978 | Maravilla et al. |
| 4,114,692 A | 9/1978 | Gallus |
| 4,144,077 A | 3/1979 | Gallus |
| 4,172,421 A | 10/1979 | Regalbuto |
| 4,192,378 A | 3/1980 | Baker et al. |
| 4,195,690 A | 4/1980 | Erbstoesser et al. |
| 4,210,457 A | 7/1980 | Dodson et al. |
| 4,256,500 A | 3/1981 | Turpin, Jr. |
| 4,256,504 A | 3/1981 | Dunstan, Jr. |
| 4,268,316 A | 5/1981 | Wills, Jr. |
| 4,286,658 A | 9/1981 | Baker et al. |
| 4,296,808 A | 10/1981 | Baker et al. |
| 4,319,638 A | 3/1982 | Baker et al. |
| 4,334,582 A | 6/1982 | Baker et al. |
| 4,353,749 A | 10/1982 | Ray et al. |
| 4,372,378 A | 2/1983 | Powers, Jr. |
| 4,407,677 A | 10/1983 | Wills, Jr. |
| 4,411,314 A | 10/1983 | Shearhart |
| 4,451,295 A | 5/1984 | Sprouse |
| 4,456,068 A | 6/1984 | Burrill, Jr. et al. |
| 4,495,162 A | 1/1985 | Jøns et al. |
| 4,505,334 A | 3/1985 | Doner et al. |
| 4,538,684 A | 9/1985 | Sheffield |
| 4,566,544 A | 1/1986 | Bagley et al. |
| 4,635,724 A | 1/1987 | Bruckdorfer et al. |
| 4,640,715 A | 2/1987 | Heitzmann et al. |
| 4,653,587 A | 3/1987 | Bodine |
| 4,753,295 A | 6/1988 | Gabriel et al. |
| 4,784,693 A | 11/1988 | Kirkland et al. |
| 4,793,409 A | 12/1988 | Bridges et al. |
| 4,823,876 A | 4/1989 | Mohaupt |
| 4,823,881 A | 4/1989 | Streich |
| 4,829,107 A | 5/1989 | Kindt et al. |
| 4,842,649 A | 6/1989 | Heitzmann et al. |
| 4,881,599 A | 11/1989 | Franco et al. |
| 4,892,589 A | 1/1990 | Kirkland et al. |
| 4,915,740 A | 4/1990 | Sakai et al. |
| 4,930,428 A | 6/1990 | Schneider et al. |
| 4,952,242 A | 8/1990 | Earp |
| 4,964,312 A | 10/1990 | Kraus |
| 4,992,102 A | 2/1991 | Barbour |
| 4,997,484 A | 3/1991 | Gravitt et al. |
| 5,005,646 A | 4/1991 | Bloys et al. |
| 5,010,955 A | 4/1991 | Springer |
| 5,061,318 A | 10/1991 | Casey et al. |
| 5,073,197 A | 12/1991 | Majumdar et al. |
| 5,108,679 A | 4/1992 | Rirsch et al. |
| 5,116,420 A | 5/1992 | Schneider et al. |
| 5,119,887 A | 6/1992 | Rosa |
| 5,121,797 A | 6/1992 | DeCuir, Sr. |
| 5,137,109 A | 8/1992 | Dorel |
| 5,161,617 A | 11/1992 | Marschke |
| 5,191,932 A | 3/1993 | Seefried et al. |
| 5,202,522 A | 4/1993 | Williams |
| 5,205,358 A | 4/1993 | Mitzlaff |
| 5,236,500 A | 8/1993 | Schneider et al. |
| 5,238,064 A | 8/1993 | Dahl et al. |
| 5,261,488 A | 11/1993 | Gullet et al. |
| 5,266,111 A | 11/1993 | Barbour |
| 5,284,207 A | 2/1994 | Bittleston et al. |
| 5,309,999 A | 5/1994 | Cowan et al. |
| 5,314,022 A | 5/1994 | Cowan et al. |
| 5,346,548 A | 9/1994 | Mehta |
| 5,346,550 A | 9/1994 | Kunzi et al. |
| 5,351,759 A | 10/1994 | Nahm et al. |
| 5,358,049 A | 10/1994 | Hale et al. |
| 5,361,833 A | 11/1994 | Schock et al. |
| 5,362,320 A | 11/1994 | Whatcott |
| 5,362,323 A | 11/1994 | Koyata et al. |
| 5,378,278 A | 1/1995 | Colburn |
| 5,383,521 A | 1/1995 | Onan et al. |
| 5,404,767 A | 4/1995 | Sutherland |
| 5,404,945 A | 4/1995 | Head et al. |
| 5,419,397 A | 5/1995 | Reynolds et al. |
| 5,425,559 A | 6/1995 | Nobileau |
| 5,439,518 A | 8/1995 | Francis et al. |
| 5,447,198 A | 9/1995 | Kunzi et al. |
| 5,472,499 A | 12/1995 | Crocker |
| 5,489,574 A | 2/1996 | Miano et al. |
| 5,520,730 A | 5/1996 | Barbour |
| 5,558,708 A | 9/1996 | Johansen, Jr. et al. |
| 5,571,281 A | 11/1996 | Allen |
| 5,604,273 A | 2/1997 | Kerkar et al. |
| 5,624,489 A | 4/1997 | Fu et al. |
| 5,626,665 A | 5/1997 | Barger et al. |
| 5,673,751 A | 10/1997 | Head et al. |
| 5,714,002 A | 2/1998 | Styron |
| 5,714,003 A | 2/1998 | Styron |
| 5,728,207 A | 3/1998 | Arfaei et al. |
| 5,728,209 A | 3/1998 | Bury et al. |
| 5,755,876 A | 5/1998 | Stokes et al. |
| 5,772,752 A | 6/1998 | Liskowitz et al. |
| 5,782,973 A | 7/1998 | Cohen et al. |
| 5,785,120 A | 7/1998 | Smalley et al. |
| 5,788,762 A | 8/1998 | Barger et al. |
| 5,794,706 A | 8/1998 | Alhamad |
| 5,797,454 A | 8/1998 | Hipp |
| 5,846,315 A | 12/1998 | Johansen, Jr. et al. |
| 5,853,474 A | 12/1998 | Hilton |
| 5,893,415 A | 4/1999 | Ricks |
| 5,928,420 A | 7/1999 | Oates et al. |
| 5,930,961 A | 8/1999 | Beaudet |
| 5,957,195 A | 9/1999 | Bailey et al. |
| 5,964,293 A | 10/1999 | Chatterji et al. |
| 5,968,254 A | 10/1999 | Dodgen et al. |
| 5,997,632 A | 12/1999 | Styron |
| 6,004,069 A | 12/1999 | Sudbury |
| 6,009,945 A | 1/2000 | Ricks |
| 6,022,408 A | 2/2000 | Stokes et al. |
| 6,036,768 A | 3/2000 | Edlinger et al. |
| 6,048,393 A | 4/2000 | Cheung et al. |
| 6,109,913 A | 8/2000 | Young |
| 6,142,230 A | 11/2000 | Smalley et al. |
| 6,143,069 A | 11/2000 | Brothers et al. |
| 6,167,968 B1 | 1/2001 | Allarie et al. |
| 6,223,818 B1 | 5/2001 | Hrupp |
| 6,241,815 B1 | 6/2001 | Bonen |
| 6,251,178 B1 | 6/2001 | Styron |
| 6,277,189 B1 | 8/2001 | Chugh |
| 6,290,772 B1 | 9/2001 | Cheung et al. |
| 6,312,515 B1 | 11/2001 | Barlet-Gouedard et al. |
| 6,322,355 B1 | 11/2001 | Young |
| 6,331,207 B1 | 12/2001 | Gebhardt |
| 6,332,921 B1 | 12/2001 | Brothers et al. |
| 6,344,081 B1 | 2/2002 | Pelot et al. |
| 6,409,819 B1 | 6/2002 | Ko |
| 6,451,104 B2 | 9/2002 | Mehta |

| | | |
|---|---|---|
| 6,461,424 B1 | 10/2002 | Ramme et al. |
| 6,464,013 B2 | 10/2002 | Bystedt |
| 6,464,019 B1 | 10/2002 | Werner et al. |
| 6,471,767 B1 | 10/2002 | Konczak |
| 6,482,258 B2 | 11/2002 | Styron |
| 6,488,763 B2 | 12/2002 | Brothers et al. |
| 6,494,951 B1 | 12/2002 | Reddy et al. |
| 6,524,384 B2 | 2/2003 | Griffith et al. |
| 6,554,888 B1 | 4/2003 | Chugh |
| 6,554,894 B2 | 4/2003 | Styron et al. |
| 6,562,122 B2 | 5/2003 | Dao et al. |
| 6,572,698 B1 | 6/2003 | Ko |
| 6,581,690 B2 | 6/2003 | Van Drentham-Susman et al. |
| 6,613,141 B2 | 9/2003 | Key, Jr. |
| 6,616,753 B2 | 9/2003 | Reddy et al. |
| 6,629,566 B2 | 10/2003 | Liknes |
| 6,633,164 B2 | 10/2003 | Vinegar et al. |
| 6,641,658 B1 | 11/2003 | Dubey |
| 6,645,289 B2 | 11/2003 | Sobolev et al. |
| 6,645,290 B1 | 11/2003 | Barbour |
| 6,648,961 B2 | 11/2003 | Brothers et al. |
| 6,656,264 B2 | 12/2003 | Barbour |
| 6,656,265 B1 | 12/2003 | Garnier et al. |
| 6,660,078 B2 | 12/2003 | Brothers et al. |
| 6,666,268 B2 | 12/2003 | Griffith et al. |
| 6,676,747 B2 | 1/2004 | Edlinger |
| 6,682,595 B1 | 1/2004 | Barbour |
| 6,684,957 B2 | 2/2004 | Allamon |
| 6,699,321 B2 | 3/2004 | Pelot et al. |
| 6,712,145 B2 | 3/2004 | Allamon |
| 6,716,282 B2 | 4/2004 | Griffith et al. |
| 6,730,161 B2 | 5/2004 | Lakshmanan et al. |
| 6,740,155 B1 | 5/2004 | Boggs et al. |
| 6,746,531 B1 | 6/2004 | Barbour |
| 6,749,679 B2 | 6/2004 | Shi |
| 6,749,682 B2 | 6/2004 | Mattus |
| 6,767,398 B2 | 7/2004 | Trato |
| 6,775,894 B2 | 8/2004 | Hardin |
| 6,776,231 B2 | 8/2004 | Allen |
| 6,776,237 B2 | 8/2004 | Dao et al. |
| 6,780,236 B2 | 8/2004 | Barbour |
| 6,796,378 B2 | 9/2004 | Reddy et al. |
| 6,811,603 B2 | 11/2004 | Brothers et al. |
| 6,814,798 B2 | 11/2004 | Vijn et al. |
| 6,832,652 B1 | 12/2004 | Dillenbeck et al. |
| 6,840,996 B2 | 1/2005 | Morioka et al. |
| 6,846,357 B2 | 1/2005 | Reddy et al. |
| 6,851,481 B2 | 2/2005 | Vinegar et al. |
| 6,877,562 B2 | 4/2005 | Bourne |
| 6,890,382 B2 | 5/2005 | Zampieri |
| 6,893,751 B2 | 5/2005 | Naji et al. |
| 6,908,507 B2 | 6/2005 | Lalande et al. |
| 6,923,263 B2 | 8/2005 | Eden et al. |
| 6,936,087 B2 | 8/2005 | Wommack et al. |
| 6,939,401 B2 | 9/2005 | Barbour |
| 6,953,091 B2 | 10/2005 | Volpert |
| 6,964,302 B2 | 11/2005 | Luke et al. |
| 6,997,260 B1 | 2/2006 | Trader et al. |
| 7,075,454 B2 | 7/2006 | Hirsch et al. |
| 7,114,561 B2 | 10/2006 | Vinegar et al. |
| 7,170,424 B2 | 1/2007 | Vinegar et al. |
| 7,255,739 B2 | 8/2007 | Brothers et al. |
| 7,282,093 B2 | 10/2007 | Brothers et al. |
| 7,288,148 B2 | 10/2007 | Hicks et al. |
| 2001/0011591 A1 | 8/2001 | Van-Drentham Susman et al. |
| 2002/0017224 A1 | 2/2002 | Horton |
| 2002/0144815 A1 | 10/2002 | Van Drentham-Susman et al. |
| 2002/0170466 A1 | 11/2002 | Naji et al. |
| 2002/0170467 A1 | 11/2002 | Naji et al. |
| 2002/0189500 A1 | 12/2002 | Naji et al. |
| 2003/0164119 A1 | 9/2003 | Naji et al. |
| 2003/0205175 A1 | 11/2003 | Wiedenhoft et al. |
| 2003/0233962 A1 | 12/2003 | Dongell |
| 2004/0035329 A1 | 2/2004 | Sullivan |
| 2004/0149171 A1 | 8/2004 | Price |
| 2004/0157181 A1 | 8/2004 | Arnold et al. |
| 2005/0045067 A1 | 3/2005 | Naji et al. |
| 2005/0066860 A1 | 3/2005 | Logan et al. |
| 2005/0084334 A1 | 4/2005 | Shi et al. |
| 2005/0092363 A1 | 5/2005 | Richard et al. |
| 2005/0103235 A1 | 5/2005 | Harrison |
| 2005/0103497 A1 | 5/2005 | Gondouin |
| 2005/0124503 A1 | 6/2005 | Morgan et al. |
| 2005/0133221 A1 | 6/2005 | Chatterji et al. |
| 2005/0160944 A1 | 7/2005 | Wagh et al. |
| 2005/0160945 A1 | 7/2005 | Barlet-Gouedard et al. |
| 2005/0269078 A1 | 12/2005 | Morgenthaler |

FOREIGN PATENT DOCUMENTS

| | | |
|---|---|---|
| EP | 0 314 118 | 5/1989 |
| GB | 2 148 871 | 6/1985 |
| JP | 54-112930 | 9/1979 |
| JP | 54-141818 | 11/1979 |
| JP | 57-095858 | 6/1982 |
| JP | 59-111958 | 6/1984 |
| WO | WO 91/19882 | 12/1991 |

OTHER PUBLICATIONS

Odler, Chapter 27 "Oil well cements" from "Special Inorganic Cements," publisher Spon Press, Jun. 2000, pp. vii-xiv and 367-372.

"Ternary Mixtures: Bibliography of Selected Publications," PCA Library Bibliography No. 15 (LP15), Portland Cement Association, 2004, pp. 1-11.

"Concrete Information—Portland, Blended, and Other Hydraulic Cements" (reprinted from "Design and Control of Concrete Mixtures" (EB001.14), Chapter 2), IS004, Portland Cement Association, 2002, pp. 1-38 + IS004.12.

"Specification for Cements and Materials for Well Cementing, American Petroleum Institute Specification 10A Twenty Second Edition, Jan. 1, 1995".

"Heavy Duty Compression Set Service Packers," Bake Oil Tools, URL: http://www.bakerhughesdirect.com/cgi/hello.cgi/BOT/public/service_tools/pdf/Page7.pdf. 2006.

"Petroleum: a primer for Kansas," found at URL: http://www.kgs.ku.edu/Publications/Oil/primer12.html, Apr. 10, 2006, p. 12 of 15.

CEMENTITIOUS COMPOSITIONS FOR OIL WELL CEMENTING APPLICATIONS

CROSS-REFERENCE TO RELATED APPLICATIONS

This application is a divisional of U.S. patent application Ser. No. 11/471,437 filed on Jun. 20, 2006. The disclosure of the above application is incorporated herein by reference.

FIELD

The present disclosure relates to cementitious compositions and more particularly to cementitious compositions for use in oil and gas wells.

BACKGROUND

The statements in this section merely provide background information related to the present disclosure and cannot constitute prior art.

Portland cement manufacturing generates various byproducts, including $CO_2$ created during calcination and burning of raw materials by firing hydrocarbon fuels. Portland cement manufacturers increasingly seek technology and processes that reduce potential environmental impact during manufacturing. For example, environmentally friendly cement products may reduce the amount of $CO_2$ or other undesirable pollutants and/or waste products and/or energy consumption while still producing comparable performance.

Thus, it is desirable to produce various Portland cement products that have a reduced environmental impact during manufacture. A cementitious product for various applications, such as oil and gas well applications, which reduces energy consumption and potential environmental impact would be highly desirable. In this regard, it is desirable to develop environmentally friendly cement products that provide comparable or enhanced performance when compared to traditional cement products.

SUMMARY

In various aspects, a cementitious composition for oil and gas well applications is provided. In one aspect, a cementitious composition comprises a hydraulic cement, a source of free lime and alkali ions, a source of calcium carbonate, a source of calcium sulfate and an organic component.

In certain aspects, a cementitious composition for oil well applications has a minimum thickening time of about 90 minutes and an eight hour compressive strength of at least about 200 psi (1.4 MPa), when the composition is mixed with water.

In some aspects, a cementitious composition for oil well applications is provided that comprises a hydraulic cement from about 50% to about 90%, a source of calcium carbonate from about 3% to about 25%, a source of free lime and alkali ions from about 1% to about 25%, a source of calcium sulfate from about 3% to about 10%, and an organic component from 0% to about 3%.

In some aspects, a cementitious composition for wellbore applications is provided that comprises a hydraulic cement present at about 50% to about 90% by weight of the composition, wherein the hydraulic cement comprises Portland cement. A source of free lime and alkali ions is also present in the composition at about 1% to about 25% by weight of the composition. The source of free lime and alkali ions comprises cement kiln dust. A source of calcium carbonate is present at about 3% to about 25% by weight of the composition. The source of calcium carbonate comprises limestone. A source of calcium sulfate comprises gypsum and is present at about 3% to about 10% by weight of the composition. An organic component is also present at less than or equal to about 3% by weight of the composition.

In certain aspects, a method is provided for using a cementitious composition in a wellbore. The method comprises pumping a cementitious slurry composition into a wellbore under pressure. The cementitious slurry composition comprises Portland cement, a source of free lime and alkali ions, a source of calcium carbonate, a source of calcium sulfate, an organic component, and water. The slurry has a minimum thickening time of about 90 minutes. A set cement product is formed in the wellbore, wherein the set cement product has an eight-hour compressive strength of about 200 to about 4,400 psi (about 1.4 to about 30 MPa).

In yet other aspects, the disclosure provides a method for cementing a casing in a wellbore comprising the steps of: admixing hydraulic cement, a source of free lime and alkali ions, a source of calcium carbonate, a source of calcium sulfate, and an organic component to form a cementitious composition. The hydraulic cement is present in the cementitious composition in an amount greater than about 50% by weight of the composition. The source of free lime and alkali ions is present in amount of less than about 25% by weight of the composition. The source of calcium carbonate is present in an amount of about 3% to about 25% by weight of the composition. Further, the source of calcium sulfate is present in an amount of about 3% to about 10% by weight of the composition, and the organic component is present in an amount of less than about 3% by weight of the composition. In the presence of water, the cement composition forms a slurry. The slurry of the cement composition is transferred into a space disposed between at least one surface of the casing and at least one surface of the wellbore. A set cement product is formed between at least one surface of the casing and at least one surface of the wellbore. In certain aspects, the set cement is formed between one or more casings.

In certain aspects, a method for using a cementitious composition in a well is provided that comprises: pumping a cementitious slurry composition into a wellbore under pressure. The cementitious composition comprises hydraulic cement, a source of free lime and alkali ions, a source of calcium carbonate, a source of calcium sulfate, an organic component, and water. The slurry has a minimum thickening time of about 90 minutes. The method comprises forming a set cement product in the wellbore, wherein the set cement product has an eight-hour compressive strength of about 200 to about 4400 psi (about 1.4 to about 30 MPa).

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION

Figure 1:
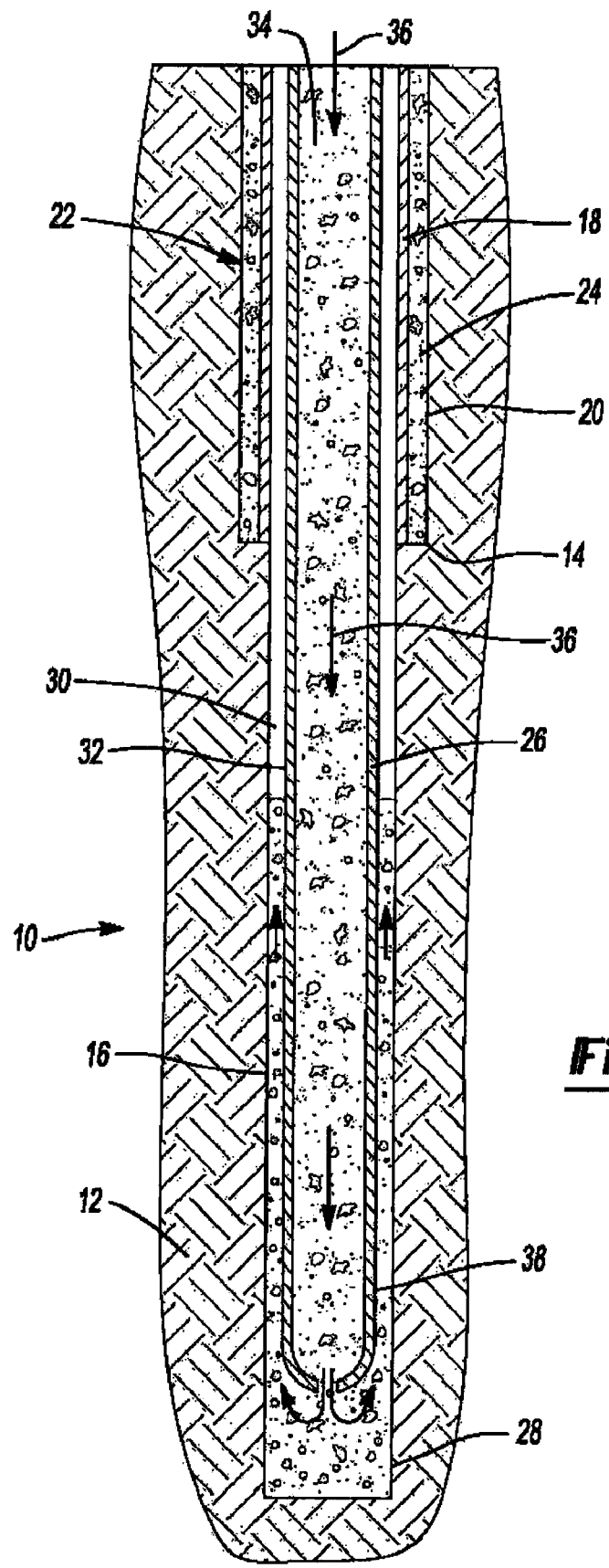
FIG. 1 is a cross-sectional view of an exemplary wellbore comprising a casing demonstrating one aspect of cementing processes used for oil and gas drilling and/or boring applications.

The following description is merely exemplary in nature and is not intended to limit the present disclosure, application, or uses.

The present disclosure provides cementitious compositions having physical characteristics that are particularly well suited for use in oil and/or gas well applications. The disclosure also provides various methods of using the compositions for cementing subterranean zones penetrated by wellbores. However, the cementitious compositions described in the present disclosure are suitable for use in a variety of applications in which cement is conventionally used, in addition to exemplary oil/gas wellbores described throughout the disclosure.

Briefly, cementitious compositions of the present disclosure comprise a hydraulic cement, a source of free lime and alkali ions, a source of calcium carbonate, a source of calcium sulfate and an organic component. In various aspects, the cementitious compositions described herein are formulated for oil and gas well cementing applications having, among other features, controlled viscosity, and a controlled set time to permit safe and proper placement of the cementitious composition within wellbores for various oil and gas well cementing applications discussed in detail below.

Cementing is a common technique employed during many phases of wellbore operations. For example, cement is often used to secure, fix, plug and/or block various components, openings, or regions within a well. As used herein, the terms "well" and "wellbore" are used interchangeably and refer generally to borings or wells drilled into subterranean zones, which will be discussed in more detail below. In some circumstances, cementitious compositions are used in forming a new wellbore and secure or fix various components (casings, liners, strings, and the like). In other examples, cementitious compositions can be used for remedial operations to repair a casing in a wellbore and/or to achieve formation isolation. In still other examples, cement compositions can be employed during well abandonment.

The cementitious compositions are particularly useful in oil and/or gas wells. It will be understood that "oil well applications" as used herein means any type of wellbore cementing application known in the art including, but not limited to, long string cementing, liner cementing, inflatable/external packer cementing, squeeze cementing, plug back cementing, temporary plug cementing, casing repair cementing, zone isolation cementing, and the like. Such operations include, but are not limited to, drilling, completion and remedial cementing operations, including those performed on existing completed wellbores, as well as those cementing operations performed during well abandonment operations. The wellbore cementing applications described herein can be performed both offshore and on land.

Often, oil and/or gas wells extend to significant depths and conditions within the well which can be harsh, for example, high temperatures and pressures are often observed. Cement operations performed in wellbores under such high stress conditions can present particular problems, among other things, difficulty in obtaining good wellbore isolation and/or maintaining mechanical integrity of the wellbore. These problems can be exacerbated when the wellbore and/or formation conditions promote fluid intrusion into the wellbore, including intrusion of water, gas, or other fluids.

In this regard, the oil and/or gas well cementitious compositions described herein can be used over a broad range of temperature and pressure. For example, the cementitious compositions described herein can be used at temperatures ranging from about 0° C. to about 250° C. (about 32° F. to about 480° F.) and pressures from 14 to 40,000 psi (0.1 to 276 MPa). Such conditions are commonly found in deep oil well drilling. In various embodiments, the cementitious compositions of the present disclosure have low to medium rheologies, demonstrate early set times that develop sufficient compressive strength propensities for use in oils wells and have low permeability. In some embodiments, the cementitious compositions have resistance to moderate to high sulfate attack, which may be desirable depending on the chemical characteristics of the geologic formations in which the well is situated (i.e., if the geologic formation has high sulfate concentration).

Primary Cementing

In a wellbore, a set cement product can be used for various purposes. Exemplary purposes include selectively isolating pre-selected regions of a wellbore from other areas within the wellbore. This process is commonly referred to as primary cementing. FIG. 1 depicts a conventional primary cementing operation, where a wellbore 10 has been drilled into a subterranean formation 12. In primary cementing, cement is commonly placed in an annulus created between an outside surface of a pipe string and an inside formation surface or wall of a wellbore in order to form a cement sheath to seal off fluid and/or solid production from formations penetrated by the wellbore. This isolation allows a wellbore to be selectively completed to allow production from, or injection into, one or more productive formations penetrated by the wellbore. The wellbore 10 comprises a drilled borehole 14 that has a generally cylindrical shape and extends into the subterranean formation 12. The borehole 14 comprises walls 20. The wellbore 10 comprises a surface casing 18 that is inserted into the borehole 14. The surface casing 18 can be cemented to the walls 20 of the well 22 by pumping a water-based slurry 24 containing a cementitious composition. Cement slurry (not shown) is pumped into the surface casing 18 and through a terminal end of the surface casing 18 and then up along a side of the surface casing 18 to fill annular regions between the surface casing 18 and the walls 20 of the borehole 14. Hydraulic cement contained in the cementitious composition solidifies and sets to form a solid cement product 24. In some cases, the wellbore 10 comprises one or more additional casings, here shown as a single additional casing 26. The additional casing 26 can be threaded through the primary casing 18 into the borehole 14 much in the same manner as the drill string (not shown). While not shown, a drill string is well known to those of skill in the art and comprises a drill pipe which is attached to tool joints that can transmit fluid and rotational power from the Kelly or top drive to the drill collars and drill bits. The additional casing 26 can be inserted to a total depth of the borehole 28. Alternately, a cement plug (not shown)

formed of solid cement product can be set at a specific depth in the borehole 28 and the additional casing 26 set on top of it.

An annular space 30 is disposed between the walls 16 of the borehole 28 and an outer surface 32 of the additional casing 26. The cementitious compositions of the present teachings can be mixed by a variety of methods with water to form a slurry 34, which are well known in the art. The slurry 34 is then pumped down the casing 26 as shown in FIG. 1, by the directional arrows 36. The cement slurry 34 is allowed to flow through a casing shoe 38 and flows up and around the casing 26 into the annular space 30.

Figure 2:
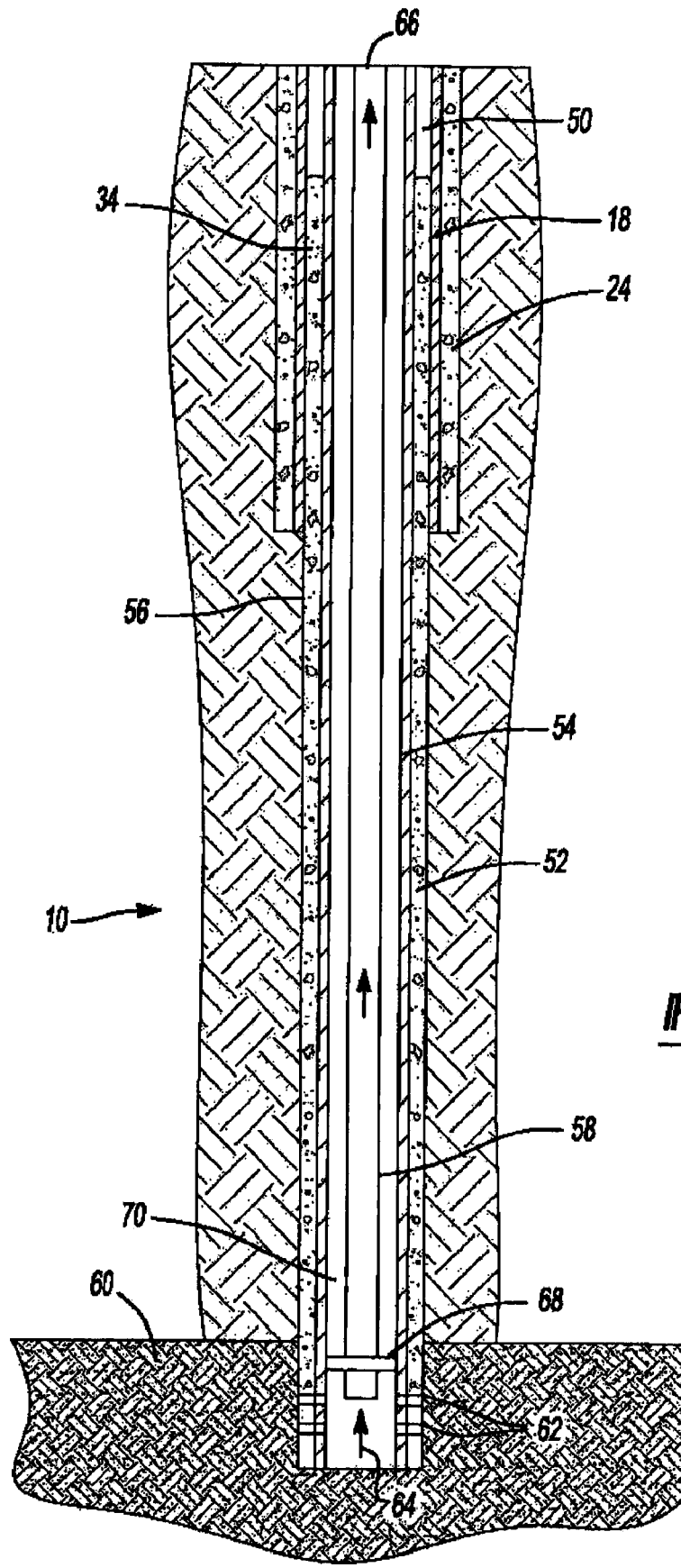
FIG. 2 is a cross-sectional view of another exemplary wellbore showing another aspect of cementing processes used for oil and gas drilling applications.

A completed casing operation is shown in FIG. 2. The pumped cement slurry 34 fills the annular space 50 and then solidifies to form a set cement product. The set cement product forms a cement sheath 52 that protects the casing 54 from damage and also prevents the migration of unwanted fluids (such as water, brine and drilling mud) from contaminating the flow of hydrocarbons into the casing 54 and up the borehole 56. After the casing 54 has been cemented, an oil or gas production tubing 58 is placed within the casing 54 and is set to a desired length down the borehole 56.

The casing 54 and the cement sheath 52 around the casing 54 can then be perforated with a plurality of apertures or perforations 62 at a specific oil and/or gas producing zone 60, thus allowing the passage of desirable hydrocarbons to flow through the perforations 62 in the cement sheath 52 and casing 54 as shown by the arrows 64 and flow to a surface 66 where it is captured and stored. A packer 68 is placed down the borehole 56 just above the hydrocarbon producing zone 60 to prevent the flow of desirable hydrocarbons into the annular space 70 between the oil producing tubing 58 and the casing 54. In various embodiments, the packer 68 can be a solidified set cement product or obstacle (not shown) that prevents the migration of desirable hydrocarbons into the annular space 70.

One objective of a primary cementing operation is to provide good isolation between producing zones up to the surface, desirably in a manner that will endure through the entire life of the well. Typically, fluid movement, either gas or liquid through the cemented annulus is normally undesirable. In this regard, possible paths for fluid movement in the annulus include the interface between cement/rock and cement/casing and the cement matrix. Cement adherence to the formation and casing can be primarily affected by cement shrinkage and by stress changes induced by down-hole variations in pressure and temperature, especially inside the casing, but also at the formation.

Secondary Cementing

In various embodiments, the cementitious compositions of the present teachings can be employed in secondary, remedial oil/gas well applications. Integral to various oil and/or gas recovery operations, such operations are often referred to as "plugback operations" that can enhance the recovery of oil and gas from wellbores that have been in production for a period of time. In certain circumstances, if there is more than one producing interval in a wellbore, and when a deeper zone has been depleted of productive hydrocarbons, a cement plugback to a higher zone may be necessary. In some embodiments, oil wells that are considered unproductive must be permanently sealed or "plugged" to protect the subterranean and surface environments. Regulations are adopted by various agencies to ensure that the plugs have a certain minimum strength and a maximum permeability. When wells are to be shut-down, hydraulic cementitious compositions are used to create hard plugs in the wellbore. The American Petroleum Institute (API) issues recommendations for performance specifications for cement compositions used to plug wells, for example. Such hard plugs should preferably meet and maintain a compressive strength of 1000 psi (about 6.9 MPa) and have a maximum permeability of 0.1 millidarcy ("md").

Figure 3:
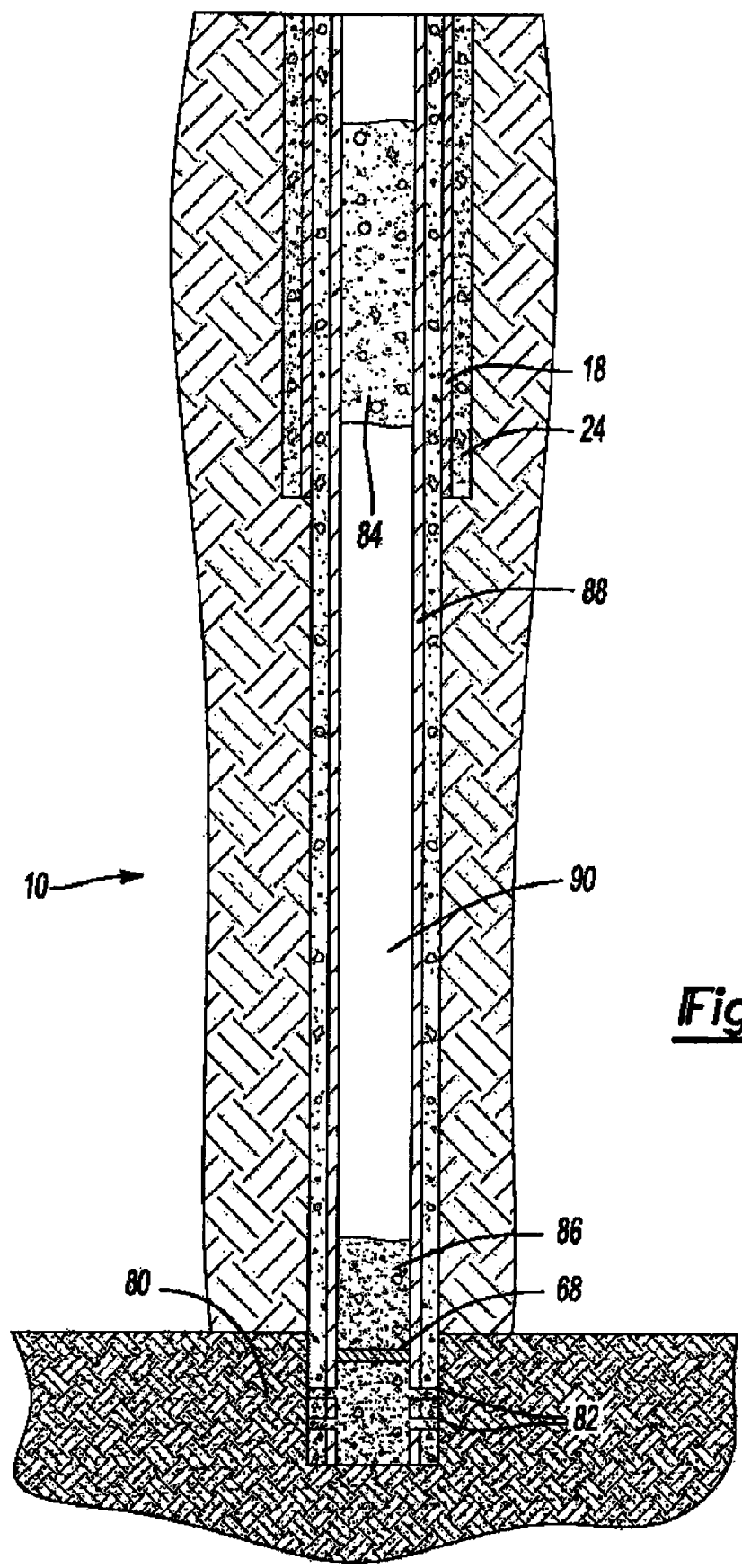
FIG. 3 is a cross-sectional view of an exemplary wellbore showing having a plug-back or remedial cement plugs in accordance with the present invention.

Now generally referring to FIG. 3, plugging operations or "plug-back" operations are often employed, for example, when a deeper zone 80 in the well has ceased to be productive, or where the bore hole has been drilled into water-producing measures or thief sands, or for any other such reason, it is desired to plug-back or close-off a deeper zone and produce from a higher zone in the well. In such bridging operations, it is usual practice first to position a bridge plug 68 in the wellbore 10 at a point adjacent the top of the zone 80 to be sealed off, and then to place a suitable quantity of cement on top of the plug 86. In various embodiments, cement plugs can also be required under various situations where the operator desires to abandon the well after it ceases to be productive.

In some circumstances, operators can be required to "plugback" the wellbore 10, including plugging the perforated portions of the wellbore 82 in addition to adding a surface plug 84 and placing a welded cap (not shown) on the surface 66 of the wellbore 10. As shown in FIG. 3, a wellbore 10 is shown with a lower plug 86 comprising a cementitious composition of the present disclosure, wherein the lower plug 86 has completely sealed off the perforations 82 formed to facilitate the extraction of desirable hydrocarbons from the oil/gas producing zones 80. In various embodiments, the annular space within the casing 88 can be filled with air or other gases. In some embodiments, a bridge plug, for example, 68 can be lowered to a specific depth and a cement plug 84 can be formed by pumping a cementitious composition according to the present teachings adjacent to the bridge plug (not shown), thereby forming a barrier or a "surface plug" 84 that prevents the flow of liquids and gasses from within the casing 88 to the surface, which would otherwise contaminate the area in which the wellbore 10 is drilled. The placement, size and lengths of the cement plugs 86 and 84 within and surrounding the wellbore 10 can vary widely and are often prescribed by the laws of the jurisdiction in which the operator is conducting oil/gas exploration and/or production.

The cementitious compositions of the present disclosure are optionally used in remedial secondary operations, including squeeze cementing operations to seal highly permeable zones or fractures in wellbores and plugging cracks and holes in pipe strings.

Figure 4:
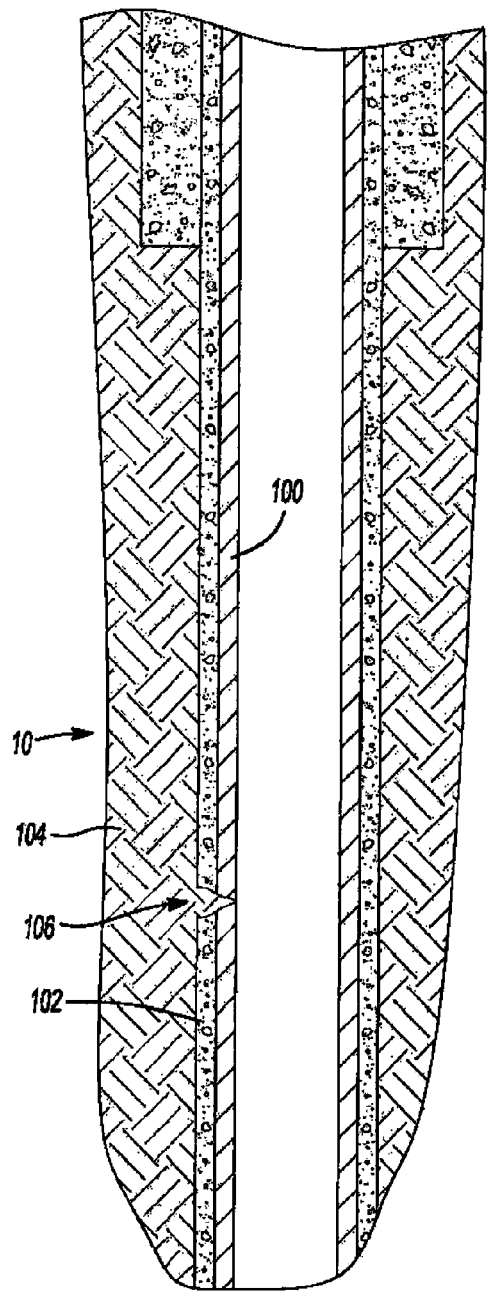
FIG. 4 is a cross-sectional view of another exemplary wellbore showing a perforation through the cement sheath and casing.

Now referring to FIG. 4, there is shown a partial cross-section of a conventional oil producing wellbore 10 that has primary cementing of the casing 100. The cement sheath 102 around the casing 100 may have defects, potentially caused by a variety of issues, such as improper curing of the cement sheath 102 while it was being formed. In other aspects of the present disclosure, the primary cementing may have been successful, but due to the adverse temperatures and pressures (from 0° C. to 250° C. (about 32° F. to about 480° F.) and from ambient pressure conditions up to 40,000 psi (276 MPa)) within the subterranean formation 104, the liner (not shown) and/or casing 100 and/or the cement sheath 102 surrounding the casing 100 may have formed cracks and small perforations such as shown in 106. The cracks and perforations 106 are problematic since they can facilitate the introduction of undesirable fluids entering into the casing 100. As shown in FIG. 4, a crack 106 has formed in the cement sheath 102 and has cracked the casing 100, potentially allowing the introduction of undesirable fluids into the interior of the casing 100.

Figure 5:
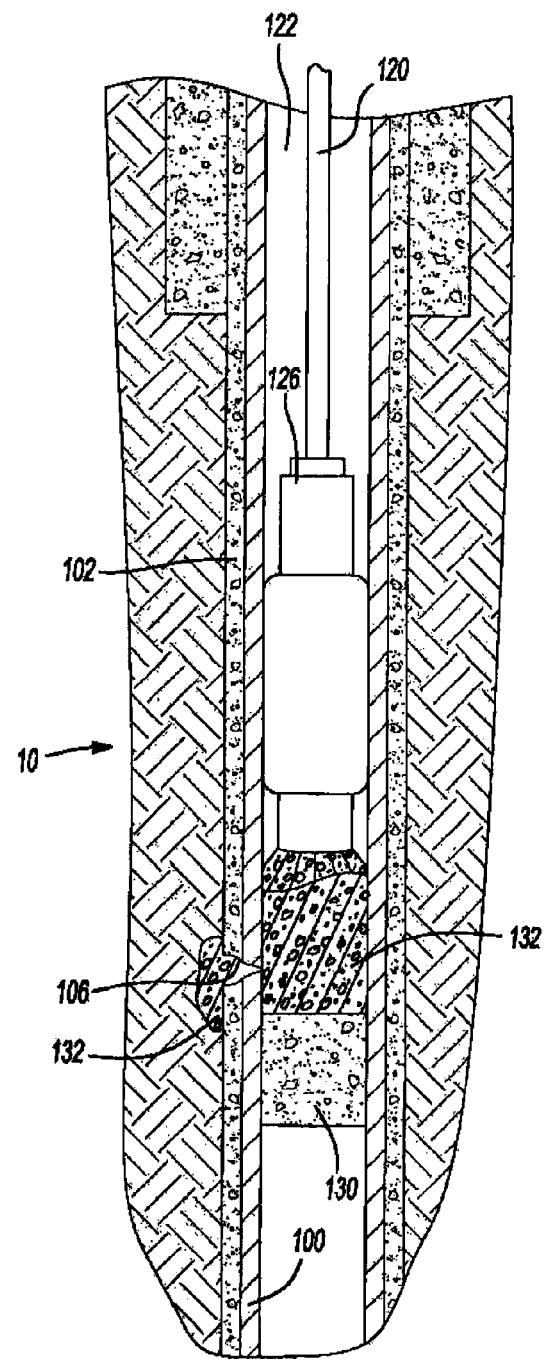
FIG. 5 is a cross-sectional view of an exemplary wellbore showing a remedial squeeze cementing procedure in accordance with the present invention.

As shown in FIG. 4, cracks and perforations can occur in a sheath 102. An exemplary crack 106 is shown in the cement sheath 102 of the wellbore 10 of FIG. 4. Such cracks 106 can be filled or plugged, as is shown in FIG. 5. As shown in FIG.

5, a drill pipe 120 can be inserted into the annular space 122 attached to a packer 126 disposed above the perforation 106. A cement plug 130 can be initially placed adjacent and below the perforation 106, to form a barrier that can allow pressurized pumping of a cementitious composition 132 of the present disclosure to fill the crack(s) and/or perforations 106 in the casing 100 and cement sheath 102. In some embodiments, the packer 126 can be lowered to a pre-selected position above the perforated zone 106 within the casing 100 and cement can be pumped from the surface down into the drill pipe 120 and into the packer 126. The cementitious composition 132 of the present disclosure can then be pumped into the perforated zone 106 under pressure.

This method of pressure squeezing a cementitious composition into cracks and perforations is known in the art as a squeeze cementing procedure. In various embodiments, the cementitious compositions of the present teachings can be used in any commonly acceptable method of squeeze cementing. Examples of such methods can include: "Bradenhead squeeze method," "Spotting squeeze method" and the "Bullhead squeeze method." Common to all such methods is the introduction of a cementitious composition into the perforations in the casing, liner, or primary cementing structure under pressure. The procedure can be facilitated with various packer devices 126 commonly used in the art of remedial cementing operations. For example, such packer devices 126 can be commercially available from Baker Hughes, and Halliburton, both of Houston, Tex., United States and World Oil Tools, Inc., of Calgary, Canada.

In various embodiments, the squeeze cementing method can comprise alternative strategies to isolate a perforated zone and prevent the flow of undesirable fluids and/or gasses into the production casing by introducing bigger perforations into the smaller cracks and holes. Accordingly, by employing known techniques to locate the voids, channels or cracks, a perforation penetrating the spaces can be made in the casing, liner and/or cement sheath and the cementitious compositions of the present teachings can then be squeezed into the spaces via the perforation so as to place the cement sheath in a more desirable condition for protecting and supporting the casing and providing fluid flow control. The success of the squeeze cementing operation is at least a function of the size of the space or spaces to be filled relative to the particle size of the cement.

Compositions

The American Petroleum Institute (API) has developed specifications for the use of various cementitious compositions, including specifications for testing the compressive strength of suitable cementitious compositions for use in various oil and/or gas well applications. The physical performance specifications for various cement compositions for use in oil and/or gas well applications are set forth in: "Specification for Cements and Materials for Well Cementing, API Specification 10A Twenty Second Edition, Jan. 1, 1995" as described by the American Petroleum Institute (herein referred to as "API Specification 10A-95") and is herein incorporated by reference in its entirety. The present disclosure provides in certain aspects, environmentally friendly oil and/or gas well cementitious compositions which meet or exceed the performance specifications set forth in 10A-95 and can substitute for known API cements currently employed for oil and/or gas well cementing applications.

In certain aspects, a cementitious composition comprises a hydraulic cement, a source of free lime and alkali ions, a source of calcium carbonate, a source of calcium sulfate and an organic component. In certain aspects, the cementitious composition comprises hydraulic cement, a source of free lime and alkali ions, a source of calcium carbonate, a source of calcium sulfate and an organic component. In various embodiments, the cementitious composition can optionally contain commonly known oil field additives including, without limitation, retarders, light and heavy additives, fluid loss compounds and accelerators. Slurries used in oil and/or gas well applications can be formulated by admixing water with hydraulic cement, a source of free lime and alkali ions, a source of calcium carbonate, a source of calcium sulfate and an organic component. A desirable water content of the slurries can be dependent on the type of oil and/or gas application, the physical and chemical conditions of the wellbore, the temperature and pressures present in the subterranean formation and the chemical nature of the subterranean formation into which a wellbore is drilled. Water content of slurries can be expressed as the weight of the water by weight of dry hydraulic cement (often referred to in the art as "by weight of cement" or "bwoc"). Methods for calculating water percentages are described as per Table 6 in the API Specification 10A-95. In a non-limiting example, a slurry comprising the cementitious composition of the present disclosure having a water content of 46% can be expressed as 46 grams of water mixed with 100 grams of substantially dry Portland cement. Alternatively, a slurry comprising the cementitious composition of the present disclosure can have a water/cement (W/C) ratio of 0.46 which is 46 grams of water mixed with 100 grams of Portland cement on a dry basis.

In some embodiments, the cementitious compositions of the present disclosure can meet or exceed one or more physical performance specifications as described in API Specification 10A-1995. In certain embodiments, the oil and/or gas well cementitious compositions of the present disclosure have minimum compressive strengths ranging from about 200 to about 4400 psi (about 1.4 to about 30 MPa) after twenty-four hours curing at atmospheric pressure and at 38° C. (approximately 100° F.).

Hydraulic Cements

In various embodiments, a hydraulic cement of the cementitious composition can include any cement comprising Portland cement, including by way of example, Portland cement, modified Portland cements and blended hydraulic cements. "Portland cement" is well known in the art and can be manufactured in a wet or a dry process kiln. While the wet and dry processes differ, both processes heat the raw material in stages. Cement manufacturing raw materials comprise calcium, silica, iron, and alumina at varying proportions, and usually include limestone, as well as a variety of other materials, such as clay, sand, or shale, for example.

The first stage of cement manufacturing is a pre-heating stage that drives off any moisture from the raw materials, removes water of hydration, and raises the material temperature up to approximately 1500° F. (approximately 800° C.). The second stage is the calcination stage which generally occurs between about 1500° F. and 2000° F. (approximately 1100° C.), where the limestone ($CaCO_3$) is converted to lime (CaO) by driving off carbon dioxide ($CO_2$) in a calcination reaction. The raw materials are then heated to a maximum temperature of between about 2500° F. to 3000° F. (approximately 1400° C. to 1650° C.) in the burning zone, where they substantially melt and flux, thus forming inorganic compounds, such as dicalcium silicate ($C_2S$ or $2CaO·SiO_2$), tricalcium silicate ($C_3S$ or $3CaO·SiO_2$), tricalcium aluminate ($C_3A$ or $3CaO·Al_2O_3$), and tetracalcium aluminoferrite ($C_4AF$ or $4CaO·Al_2O_3·Fe_2O_3$). The molten raw material is cooled to solidify into an intermediate product in small lumps, known as "clinker" that is subsequently removed from the kiln. Clinker is then finely ground and mixed with other additives (such as a set-retardant, gypsum) to form Portland cement.

Generally, a portland cement comprises about 35 to about 65% of $C_3S$, about 15 to about 40% of $C_2S$, about 0 to about 15% $C_3A$, and about 6 to about 20% $C_4AF$. As used herein, all percentages are on a weight basis, unless indicated as otherwise. Expressed in another way, a typical simple metal oxide analysis of Portland cement indicates that it contains approximately 65% CaO, 20% $SiO_2$, 5% $Al_2O_3$, 4% $Fe_2O_3$, with lesser amounts of other compounds, such as oxides of magnesium, sulfur, potassium, sodium, and the like. A simple oxide analysis calculated from elemental analysis is conventional in the art, however, as appreciated by those of skill in the art, the various active compounds may actually be present in the source as more complex molecules, for example, as $C_2S$, $C_3S$, $C_3AF$, and $C_3A$.

Conventional Portland cement compositions and specifications are set forth in American Society of Testing and Materials (ASTM) C 150-97 which is herein incorporated by reference in its entirety. For certain applications, such as oil/gas well use, other guidelines, such as the API Specification 10A-95, set forth the compositional requirements and performance specifications for certain categories of cements. Under the API Specification 10A-95, certain classes of API cements have physical performance characteristics that are comparable to ASTM C 150 specified cements. For example, API Class A cement is similar (or equivalent), although may not be identical in physical performance to ASTM C 150, Type I cements. In accordance with various aspects of the disclosure, the cementitious compositions provided have comparable or improved physical performance characteristics to the physical performance specifications set forth in the API Specification 10A-95, however, do not necessarily have the composition (i.e., specified constituent components) set forth by the API Specifications. In this regard, various cementitious compositions of the disclosure provide a benefit of reduced environmental impact, by using new cementitious compositions in lieu of traditional cementitious components, while still providing cement products that have comparable or improved physical performance specifications when compared to conventional API specification classifications for cement compositions.

In various embodiments, the cementitious composition of the present teachings can include one or more "hydraulic cements." In some embodiments, the hydraulic cement comprises a Portland cement that comprises one or more hydraulic calcium silicates, such as tricalcium silicate, $C_3S$; dicalcium silicate, $C_2S$; tricalcium aluminate, $C_3A$; and calcium aluminoferrite, $C_4AF$ inter alia. In some embodiments, a hydraulic cement comprises a "Portland cement," such as those described in ASTM C 150-97, a "modified Portland cement" (also known as expansive cement) such as those described in ASTM C845, or "blended hydraulic cements," which are mixtures of portland cement and a pozzolan, as outlined in ASTM C 1157-03, Performance Specification for Hydraulic Cements, which is herein incorporated by reference in its entirety. Pozzolans are usually silicaceous materials that are not in themselves cementitious, but which develop hydraulic cement properties when reacted with free lime (free CaO) and water, such as fly ash and slags.

In various embodiments, the hydraulic cement comprises a Portland cement that can be one or more of the Portland cement types described in ASTM C 150-97. For example, ASTM C 150-97 specifies the chemical compositions and performance requirements for Portland cement classes Type I to Type V. As is well known in the art, Type I Portland cement is a general-purpose cement that can be used as a hydraulic cement in the cementitious compositions of the disclosure, in addition to various other components added to create a specified oil/gas well cement. Type II Portland cement can be used when protection against moderate sulfate attack is required, as Type II contains a relatively low concentration of tricalcium aluminate ($C_3A$) content, approximately 2 to 8% w/w. Type III Portland cement is typically used for its high early strength, usually attaining full strength within a week. Type III Portland cement has finer ground particles (e.g., smaller average particle size) than Type I Portland cement. Type III Portland cement typically sets faster than other cement types and can have additional or modified set retarders to prevent premature setting of the cement during oil well applications. Type IV Portland cement has lower heat evolution during hydration and are slower at setting than other types of Portland cement. Type V Portland cement is particularly useful when severe sulfate attack is likely. Type V Portland cement has reduced $C_3A$ content, typically less than 5% and low water to cementitious components ratios are usually required. Any of the above cement types are suitable for use as a hydraulic component in the cementitious compositions of the present disclosure.

As described above, ASTM C 1157-03 specifications provide for six types of hydraulic cements including: Type GU (General Use), Type HE (High Early Strength), Type MS (Moderate sulfate resistance), Type HS (High sulfate resistance), Type MH (Moderate Heat of Hydration) and Type LH (Low Heat of Hydration). Any one of these hydraulic specified cements can be used in the present teachings including, but not limited to a Blended Hydraulic Cement Type MS, or a Portland Cement Type HS. In various embodiments, ASTM C 1157-03 can specify a blended cement as having more than 15% mineral additive and a modified Portland cement as having up to 15% mineral additive, for example, cement kiln dust modified Portland cement.

The choice of hydraulic cement used in the present disclosure is dependent upon the ultimate physical properties of the set, hardened cement and the soil conditions (e.g., presence of sulfates and acids in the ground) in which the cement is to be utilized. Other factors that play a role in the selection of the hydraulic cement can include, but not limited to, the degree of particulate fineness required, the depth and conditions of the well, the quantities of inorganic mineral to be added, the manner in which the cementitious composition is to be used in the oil well application and the like. The basis for the selection of one or more hydraulic cement classes or types for the use in oil/gas well applications is well understood by those skilled in the art and can be dependent among other things, the depth at which the cement is to be used, the physical requirements and the chemical environment in which the oil well cementitious composition will ultimately be employed.

In certain embodiments, the hydraulic cement component is present in the cementitious composition at greater than or equal to about 50%, in some embodiments greater than or equal to about 60%, in some embodiments greater than or equal to about 70%, in some embodiments greater than or equal to about 80%, and in some embodiments greater than or equal to about 85% by weight of the dry cementitious composition (exclusive of water). In certain embodiments, the hydraulic cement component is present at about 50% to about 90% by weight of the cementitious composition on a dry basis. In some embodiments, the hydraulic cement is present in the cementitious composition at about 72% to about 89% by weight.

In various embodiments, the hydraulic cement component has an average particle size varying from about 6 μm to about 100 µm, from about 10 µm to about 90 µm, from about 20 µm to about 70 µm. In certain embodiments, the hydraulic cement component of the cementitious composition has a Blaine fineness range of about 220 to about 600 m²/kg.

Source of Free Lime and Alkali Ions

A source of free lime and alkali ions is included in the cementitious compositions of the disclosure. "Free lime" refers to the free calcium oxide (free CaO) readily available in a material for a hydration reaction with water. Unslaked lime, also referred to as quick lime, contains a high concentration of dehydrated (free) lime or simple calcium oxide (CaO) that can undergo reaction with water, i.e., slaking. Free lime content is often used as an indicator of the reactivity of calcium oxide containing materials. In certain embodiments of the invention, the free lime content is greater than or equal to about 0.1%.

In certain aspects, such a source of free lime and alkali ions is a byproduct of a manufacturing source. In some embodiments, the source of free lime can include CaO not bound to other inorganic compounds, e.g. silicates and ferrites. As appreciated by one of skill in the art, such sources can have varied compositions, depending on the manner in which they are made; the chemical composition of the raw materials and fuels that are employed to manufacture the source; the conditions and duration that the material is stored; as well as a variety of other factors known by one of ordinary skill in the art that would affect the typical composition of the source of free lime and alkali ions from different sources.

In various embodiments, the source of free lime and alkali ions can comprise one or more active compounds including: CaO, $K_2O$, $Na_2O$, and mixtures thereof. Generally, the constituents of various materials are expressed by a simple oxide analysis calculated from elemental analysis as is conventional in the art, so that various active compounds may actually be present in the source as more complex molecules, such as alkali metal sulfates, for example. Some alkali metal ions complex with various complex anions, such as sulfates, however, a typical analysis of alkali content expresses the alkali metal oxides and sulfates individually. However, as discussed above, it should be noted that free lime as defined here refers to CaO as a simple oxide. Sources of free lime and alkali ions, particularly those alkali ions and CaO containing sufficient unreacted free lime (CaO) can be highly cementitious.

In certain embodiments, the source of calcium oxide and alkali metal oxides comprises free lime (CaO) at greater than or equal to about 0.1%, optionally greater than or equal to about 1%, optionally greater than or equal to about 3%, optionally greater than or equal to about 5%, optionally greater than or equal to about 7%, optionally greater than or equal to about 10%, optionally greater than or equal to about 15%, and in some embodiments greater than or equal to about 20% by weight.

In various embodiments, the source of free lime and alkali ions can comprise an amount of alkali ion source in the form of sodium oxide ($Na_2O$) and/or potassium oxide ($K_2O$) at greater than or equal to about 1% by weight. In some embodiments, the amount of alkali ion source in the form of sodium oxide ($Na_2O$) and/or potassium oxide ($K_2O$) is greater than or equal to about 1% by weight; optionally greater than or equal to about 3% by weight.

In some embodiments, the source of free lime and alkali ions can be cement kiln dust (CKD). CKD is a waste byproduct of the Portland cement manufacturing process, as described above. Portland cement clinkers are formed by high temperature calcining of appropriate raw materials, typically mixtures of limestone and clay or a low grade limestone already containing a sufficient quantity of argillaceous materials often with added quantities of lime to adjust the final composition. CKD can be variable in its chemical composition, based on its collection from a variety of points within a cement kiln (and the relative amount of reaction undergone at those points), as well as due to the variability in the starting raw materials to produce the Portland clinker. The primary constituents of CKD, in addition to free lime, typically include silicates, calcium oxide, potassium oxide, sulfates and sulfites, calcium silicates, chlorides, calcium carbonates, metal oxides and sodium oxide.

As discussed above, Portland cement clinkers are produced in rotary kilns and a certain quantity of finely divided dust (cement kiln dust) is produced as a by-product, generally about 10-30% of the clinker output in so-called wet process plants and up to 5-15% in dry process plants. The evolved dust is removed by various separating techniques at various collection points in the kiln. While a portion of generated CKD is recycled to the cement kiln during manufacturing, it typically is not readily added to clinker, as it tends to excessively elevate the alkalinity of the ultimate Portland cement.

The quantities of CKD that are produced annually are relatively large and are likely only to increase in the future. As of 1990, the amount of CKD was estimated as accumulating at a rate of 2-10 million tons per year in the United States alone. Tens of millions of tons of CKD are currently stockpiled in landfills around the country. In various embodiments, the CKD waste by-product can be effectively recycled within useful cementitious compositions, thereby lowering energy expenditures, as well as raw material costs.

While CKD compositions will vary for different kilns, CKD usually has at least some cementitious and/or pozzolanic properties, due to the presence of the dust of clinker and calcined materials. CKD generally comprises free lime (CaO). Typical CKD compositions also comprise silicon-containing compounds, such as silicates including tricalcium silicate, dicalcium silicate; aluminum-containing compounds, such as aluminates including tricalcium aluminate; and iron-containing compounds, such as ferrites including tetracalcium aluminoferrite. Exemplary CKD compositions comprise about 10 to about 60% calcium oxide (complex and simple calcium oxides), optionally about 25 to about 50%, and optionally about 30 to about 45% by weight. In some embodiments, CKD comprises a concentration of free lime (available for a hydration reaction with water) of about 1 to about 10%, optionally of about 1 to about 5%, and in some embodiments about 3 to about 5%. Further, in certain embodiments, CKD comprises compounds containing alkali metals, alkaline earth metals, and sulfur, inter alia.

Alternatively, other sources of free lime and/or alkali metal ions can be suitable for use as an admixture to gas/oil well cements, including mixtures of sources that provide adequate free lime and alkali metal ions. Such sources can include mixtures of distinct materials. One example of a suitable source of free lime is lime kiln dust (LKD), a byproduct from the manufacturing of lime. Manufactured lime is often categorized as high-calcium lime, dolomitic lime, or hydraulic lime and varies based upon the processes that form it. Lime is often produced by a calcination reaction conducted by heating calcitic raw material, such as calcium carbonate ($CaCO_3$), to form free lime CaO and carbon dioxide ($CO_2$). High-calcium lime has a high concentration of calcium oxide and typically some impurities, including aluminum-containing and iron-containing compounds. High-calcium lime is typically formed from high purity calcium carbonate (about 95% purity or greater). Typical calcium oxide content in an LKD product derived from high-calcium lime processing is greater than or equal to about 75% by weight, optionally greater than or equal to about 85% by weight, and in some cases greater than or equal to about 90% by weight. In some lime manufacturing, dolomite ($CaCO_3 \cdot MgCO_3$) is decomposed by heating to primarily generate calcium oxide (CaO) and magnesium oxide (MgO), thus forming what is known as dolomitic lime. In LKD generated by dolomitic lime processing, calcium oxide can be present at greater than or equal to about 45% by weight, optionally greater than about 50% by weight, and in certain embodiments, greater than about 55% by weight. While LKD varies based upon the type of lime processing employed, it generally has a relatively high concentration of free lime. Typical amounts of free lime in LKD are about 10 to about 50%, optionally about 20 to about 40%, depending upon the relative concentration of calcium oxide present in the lime product generated.

The free lime and alkali ion containing material, such as CKD or LKD, can be generally included in the oil and/or gas well cementitious composition at greater than 0%, optionally greater than or equal to about 1%, optionally greater than or equal to about 3%, optionally greater than or equal to about 5%, optionally greater than or equal to about 7%, and in some embodiments, greater than or equal to about 9%. Thus, the source of free lime and alkali ions can be present in the cementitious composition from greater than 0% to less than or equal to about 25% by weight of the composition on a dry basis. In certain embodiments, the source of free lime and alkali ions can be present in the cementitious composition from greater than 0% to less than or equal to about 10%, and optionally at greater than 0% to about 5% by weight of the composition on a dry basis.

In some embodiments, where the source of free lime and alkali ions comprises CKD, the CKD is present in the cementitious composition in an amount of about 1% to about 25%, of about 5 to about 20%, of about 10% to about 18%, of about 12 to about 15%, of about 7 to about 12%, by dry weight of the oil well cementitious The use of the CKD as a substitute material to other components (such as Portland cement) in the production of a cementitious composition of the present disclosure decreases fuel and raw material consumption thereby reducing cost of production and potentially toxic by-products. Using CKD for other commonly-used cements such as Portland containing cements in oil and/or gas well cementing compositions exemplifies an environmentally sustainable product.

Calcium Carbonate

In various embodiments of the present teachings, a source of calcium carbonate is included in the cementitious composition. As described herein, a source of calcium carbonate can include any material that can provide $CaCO_3$ in a soluble or insoluble form. In various embodiments, a calcium carbonate source can be derived from limestone, aragonite, calcite, chalk and the like. In various embodiments, the source of calcium carbonate in the cementitious composition is present at about 5% to about 25% by weight of the composition on a dry basis. In certain embodiments, the source of calcium carbonate is present in the cementitious compositions at about 5% to about 20%, optionally about 5% to about 15% by weight of the composition on a dry basis.

In various embodiments, the cementitious composition of the present teachings can comprise limestone in the range of from about 5% to about 25% by dry weight of the composition. In accordance with the present disclosure, the cementitious composition can comprise limestone in the range from about 3% to about 25%, from about 5% to about 20%, from about 10% to about 17%, from about 12% to about 15%, by dry weight of the composition Calcium Sulfate In various embodiments of the present teachings, the cementitious compositions also include a source of calcium sulfate. As used herein, the calcium sulfate source can be any source that can produce $Ca^{2+}$ and $SO_4^{2+}$ ions in an aqueous medium. Any source of calcium sulfate can be used including one or more of anhydrous $CaSO_4$ (anhydrite), angelite, selenite, alabaster, calcium sulfate dihydrate (gypsum), calcium sulfate hemihydrate and sulfite sludge and the like. In some embodiments, the calcium sulfate source is gypsum having a specific gravity of between 1.5 and 3.2.

In various embodiments, the cementitious compositions of the present disclosure comprises a source of calcium sulfate at about 2% to about 10%, optionally at about 3% to about 10%, optionally at about 5% to about 10%, by weight of the cementitious composition on a dry basis.

Organic Components

The cementitious composition of the present disclosure also includes one or more organic components. In some embodiments, the organic component can comprise one or more of: polyhydric alcohols, alkanolamines, amine acetates, salts and equivalents thereof.

Organic components can also include grinding additives/aids commonly known in the art of Portland cement manufacturing. Such organic components can be one or more of polyhydric alcohols (polyols), including polyols such as glycol. In some embodiments, the organic component can comprise polyols. Polyols are commercially available from AXIM Middlebranch, Ohio UNITED STATES for example, under the trade name AXIM-155, and from W.R. Grace Co, Cambridge, Mass. UNITED STATES for example, under the trade name MTDA®. In some embodiments, the organic component can include alkanolamines and their derivative compounds. In some embodiments, organic components containing alkanolamines are commercially available from W.R. Grace Co. Cambridge, Mass. UNITED STATES for example, under the trade name CBA®. In some embodiments, the organic component can include amine acetate compounds. Amine acetates and their salts are commercially available from W.R. Grace Co. Cambridge, Mass. UNITED STATES for example, under the trade name HEA2®.

In various embodiments, the cementitious compositions of the present disclosure comprises one or more organic components in the range of from about 0% to about 3%, from about 0.1% to about 3%, from about 0.5% to about 2.5%, from about 1% to about 2% by weight of the composition on a dry basis As described herein, in certain aspects, the cementitious compositions of the present teachings comprise respective particles of hydraulic cement, cement kiln dust, limestone, and gypsum admixed with water to form a slurry. In certain aspects, the slurry comprises a mixture of small or fine particles. In some embodiments, the slurry comprises particles having an average particle diameter ranging from 10 to 10,000 times smaller than the diameter of the perforations or cracks. In some embodiments, the particles in the slurry have an average particle size of less than about 150 µm (microns), less than about 120 µm, less than about 100 µm, less than about 80 µm, less than about 70 µm, less than about 50 µm, or less than about 30 µm. In certain aspects, a slurry of cementitious compositions comprising fine-sized particles can be used to penetrate, plug and set in fine cracks or holes in well pipes, casings, liners and in channels and microannulus spaces in and around the cement sheath 102 using squeeze cementing methods commonly known in the art.

Methods

In certain aspects, the cementitious compositions are formulated for oil and/or gas well cementing applications. In various embodiments, cementing operations for use in an oil and/or gas wellbore require a cementitious composition that has a controlled viscosity and a controlled set time to permit safe and proper placement of the cementitious compositions described herein, but also enabling the slurry to set rapidly after placement and minimizing rig time standby. Furthermore, due to the environmental conditions found within a wellbore, some cementitious compositions should be able to reach a predetermined strength at an acceptable speed. In some embodiments, the hardened cement must be sufficiently resistant to chemical attack by sulfates and other chemicals known to degrade the cement, such as alkali carbonation, and further operate under extremes of temperature and pressure for example 0° C. to about 250° C. (32° F. to about 480° F.) and from ambient pressure conditions up to 40,000 psi (276 MPa) of pressure, as often observed in subterranean formations.

The present disclosure provides for methods for using a cementitious composition in a wellbore comprising: (a) pumping a cementitious slurry composition into a wellbore under pressure, wherein the cementitious slurry composition comprises hydraulic cement, a source of free lime and alkali ions, a source of calcium carbonate, a source of calcium sulfate, an organic component, and water, and wherein the slurry has a minimum thickening time of about 90 minutes; and (b) forming a set cement product in the wellbore, wherein the set cement product has an eight-hour compressive strength of about 200 to about 4,400 psi (about 1.4 to about 30 MPa).

The cementitious compositions of the present disclosure can replace certain API specified oil and/or gas well cements for oil and/or gas well applications. In order to ascertain the suitability of a specific cement under varying conditions associated with oil and/or gas well cementing applications, the cementitious compositions preferably meet certain specification criteria including, minimum setting times, minimum hardening times and compressive strengths after 8 and 24 hours curing. Such specifications can be quantified using established API testing procedures outlined in the API Specification 10A-95.

The cement performance specifications are important for oil and/or gas well cementing operations, primarily because control over placement of the cementitious slurry is needed (e.g., the cementitious slurry should be placed exactly where it is needed), as well as a need for the slurry to retain sufficient mobility during the entire cementing procedure. After setting, the hardened cement should attain a predetermined strength at an acceptable rate that would enable resistance to the flow of gas and liquids with minimal volume changes during setting and hardening. A cementitious composition having desirable rheology and compressive strength may enable the oil and/or gas well operator to expedite subsequent oil and/or gas drilling procedures and reduce rig time standby while the cement hardens to the proper strength before completing the wellbore.

Under the API Specification 10A-95, the methods used to test the compressive strength of a particular cement are based on the ASTM C-109 protocol, with some modifications. The compressive strength is typically tested by mixing Portland cement (500 g) with sand (1375 g). For non-air entraining Portland cement, the dry components are mixed with 242 g of water. The resultant slurry is placed into molds and tamped thoroughly. The molds are then placed in a moist room and immersed in saturated lime water. In some samples, the molds are placed in pressurized vessels for curing at temperatures up to 160° C. (320° F.) and pressures up to 3000 psi±50 psi (20.7 MPa+0.3 MPa) (Tables 7 & 8 API Specification 10A-95). The specimens are then removed from the molds and placed into a testing machine that can calculate the compressive strength of each specimen. The compressive strength of the specimen is recorded in pounds per square inch (psi) and expressed in Pascals (Pa) and is calculated by dividing the maximum load in $lb_f$ by the cross-sectional area in square inches.

In various embodiments, the cementitious compositions of the present disclosure can be formulated to give a range of hardening times that can be tailored to fit the type of oil and/or gas well application requiring such a cementitious composition. The thickening time is referred to in the art of cement and concrete manufacture as the elapsed time between the initial application of pressure and temperature to the pressurized vessel containing the test cement, known in the art as a "atmospheric consistometer" and "pressure consistometer" and the time the slurry reaches a consistency of 100 $B_c$. The symbol "$B_c$" is known as Bearden Units of Consistency. The pressure or atmospheric consistometer is calibrated with calibration oil of known consistency over the range from 5 to 100 $B_c$. Detailed instructions of how to calculate the thickening time of a given cement slurry can be obtained from the API Specification 10A-95. In various embodiments, the present composition can have minimum thickening time of about 90 minutes to reach a consistency of 100 $B_c$ (as defined in Table 3 of API Specification 10A-95).

In certain embodiments, the cementitious compositions of the present disclosure comprise a hydraulic cement, a source of calcium oxide, a source of free lime (CaO) and alkali ions, an organic component, a source of calcium carbonate; and a source of calcium sulfate are mixed and interground to a fineness of (Blaine) (degree of fineness measured in specified surface area in $m^2/kg$) that ranges from a minimum from about 220 $m^2/kg$ to about 600 $m^2/kg$. The Blaine value can be calculated using an air permeability device, as described in ASTM C 204: Fineness of Portland Cement by Air Permeability Apparatus (1992).

The inventive cementitious compositions of the present disclosure can be formulated having equivalent physical specification standards to those described in the API Specification 10A-95 for the various classes of oil and/or gas well cements described therein.

The cementitious compositions of the present teachings can be used in primary and secondary oil and/or gas well applications. Such primary oil and/or gas well applications can include cement casing operations. Secondary oil and/or gas well applications can include: cement liner operations, cement squeeze operations and cement plugback operations among others. In various embodiments, the cementitious compositions of the present disclosure include a method for cementing a casing for the completion of oil and/or gas wellbores. In various embodiments, a hydraulic cementitious composition according to the present disclosure is mixed with water to form a slurry, and is subsequently pumped into a wellbore having a first surface and a second surface that require cementing. For example, the slurry can be pumped into the annular space between at least one surface of the walls forming the wellbore and at least one exterior surface of a casing pipe contained within the wellbore. The slurry is placed within the wellbore and then cures and sets into a hardened mass in the annular space forming a substantially impermeable cement that supports the string pipe and casing in the wellbore. The string pipe or casing is thereby immoveably positioned in the wellbore, and thereby sealing the subterranean zone so as to control the flow of fluids present at different levels in the formations.

In various embodiments, the quantity of water used to make the slurry varies depending on the particular chemical condition composition of the wellbore, the time required for setting, the method of transporting and placement of slurry in position, the depth of the wellbore and the physical conditions in intimate contact with the slurry such as the temperature and pressure conditions existing in the wellbore. In some embodiments, the slurry can be achieved by mixing the dry and/or liquid components of the cementitious composition with a water percentage varying from about 30% to about 220% w/w of the dry hydraulic cement (bwoc). In some embodiments, the density of the slurry can be calculated by any means commonly used in the art. For example, the slurry of the present disclosure can have densities that range from about 10 lb/gal to about 20 lb/gal (about 1.2 kg/L to about 2.4 kg/L). Methods for calculating water percentages are described above. As appreciated by skilled artisans, a greater or lesser amount of water can be used depending upon the desired consistency and density of the slurry required. In various embodiments, the cementitious composition can be added to water and the resultant slurry can have consistencies ranging from about 5 to about 35 $B_c$. The water can be any type of water, although preferably the water does not contain undesirable or excess compounds that are well known to those of ordinary skill in the art to adversely affect the chemical and physical properties of the cements and their intended uses. In various embodiments, the water used to form a slurry can include any one or a mixture of: fresh water, sea water, brine, and saturated salt solutions.

In various embodiments, a method for cementing a casing in a wellbore comprises the steps of: (a) admixing hydraulic cement, a source of free lime and alkali ions, a source of calcium carbonate, a source of calcium sulfate, and an organic component to form a cementitious composition, wherein the hydraulic cement is present in said the cementitious composition in an amount greater than about 50% by weight of the composition, the source of free lime and alkali ions is present in amount of less than about 25% by weight of the composition, the source of calcium carbonate is present in an amount of about 3% to about 25% by weight of the composition, the source of calcium sulfate is present in an amount of about 3% to about 10% by weight of the composition, and the organic component is present in an amount of less than about 3% by weight of the composition, wherein in the presence of water, the cement composition forms a slurry; (b) transferring a slurry of the cement composition into a space between at least two surfaces to be cemented; and (c) forming a set cement between the two surfaces to be cemented. In certain embodiments, the at least two surfaces to be cemented include at least one surface of the casing and at least one surface of the wellbore, and the cement is formed between the at least one surface of the casing and at least one surface of the wellbore.

In various embodiments, a method for "plug-back" operations in a wellbore comprises the steps of: (a) admixing hydraulic cement, a source of free lime and alkali ions, a source of calcium carbonate, a source of calcium sulfate, and an organic component to form a cementitious composition, wherein the hydraulic cement is present in said the cementitious composition in an amount greater than about 50% by weight of the composition, the source of free lime and alkali ions is present in amount of less than about 25% by weight of the composition, the source of calcium carbonate is present in an amount of about 3% to about 25% by weight of the composition, the source of calcium sulfate is present in an amount of about 3% to about 10% by weight of the composition, and the organic component is present in an amount of less than about 3% by weight of the composition, wherein in the presence of water, the cement composition forms a slurry; (b) transferring a slurry of the cement composition into a predetermined (e.g., terminal end, lower region) portion of the casing; and (c) forming a set cement in the desired position within the casing in or near the bottom of a well to exclude water or to produce from a formation higher in the well.

In various embodiments, cracks and perforations formed in the casing, liner or primary casing cement require remedial repair to prevent entry of unwanted liquids. Squeeze cementing is a method that can be performed comprising the steps of: (a) admixing hydraulic cement, a source of free lime and alkali ions, a source of calcium carbonate, a source of calcium sulfate, and an organic component to form a cementitious composition, wherein the hydraulic cement is present in said the cementitious composition in an amount greater than about 50% by weight of the composition, the source of free lime and alkali ions is present in amount of less than about 25% by weight of the composition, the source of calcium carbonate is present in an amount of about 3% to about 25% by weight of the composition, the source of calcium sulfate is present in an amount of about 3% to about 10% by weight of the composition, and the organic component is present in an amount of less than about 3% by weight of the composition, wherein in the presence of water, the cement composition forms a slurry; (b) pumping the slurry of the cement composition by pressure behind the casing to specified points in a well to permit the slurry to penetrate the perforations and cracks and (c) forming a set cement in the desired position within the perforations or cracks or other defects in the liner, casing, primary casing cement and the like. In some embodiments, it may be necessary to drill out the cement from inside the casing and reperforate the casing at the desired points, to replace the old perforations.

In the following examples, API cement classes A, C or G equivalents are made, employing ASTM C 150 type Portland cements, although as appreciated by those of skill in the art, various methods of making such classes or equivalents can likewise be made and are used as the hydraulic cement. The API Class equivalent cements comprise Portland cement clinker. The physical properties of the cementitious compositions described in Examples 1-3 are determined in accordance with the test procedures set forth in API Specification 10A-95. In order to illustrate the methods and compositions of the present teachings, the following examples are given.

EXAMPLE 1

In a container, a cementitious composition is prepared by mixing the following components: 617 grams of an ASTM C 150 Type I/II Portland cement, (Holcim Inc., Ada, Okla. UNITED STATES); 39 grams CKD (fresh), (Holcim Inc., Ada, Okla. UNITED STATES); 77 grams limestone, (Holcim Inc., Ada, Okla. UNITED STATES); 39 grams gypsum, (Harrison Gypsum Co, Lindsay, Okla. UNITED STATES) and 0.7 grams of an organic grinding aid (a polyol compound) component, commercially available as MTDA™ (W.R. Grace Co., Cambridge, Mass. UNITED STATES). The dry blended composition is then mixed for 1 to 5 minutes at 12,000 rpm in a mixer. The dry blended composition is slowly introduced into a separate container having 355 grams of water. The slurry is stirred for about 30 minutes and is sealed with a lid to prevent evaporation. The cementitious slurry is tested for the minimum thickening time until it reaches a thickness of 100

$B_c$ and the compressive strength of the composition at 38° C. (100° F.) after 8 hours and 24 hours, particle size distribution by passing through (44 µm) mesh and determination of specific surface area (Blaine). The exemplary properties are set forth in Table 1 below. As appreciated by skilled artisans, the hydraulic cement component can be any ASTM C150 Portland cement and/or ASTM C 1157 blended hydraulic cement. ASTM C 150 type Portland cements are merely exemplary and can be any ASTM C150 Portland cement or mixes thereof, such as ASTM C 150 types I, II, III, and V for example.

EXAMPLE 2

Example 2 is prepared in a similar manner to Example 1. In Example 2, the type of hydraulic cement is ASTM C 150 Type III cement. The dry blended composition is slowly introduced into a separate container having 383 grams of water. The exemplary properties are set forth in Table 1 below.

EXAMPLE 3

Example 3 is prepared in a similar manner to Example 1. In Example 3, the type of hydraulic cement is ASTM C 150 Type II/V cement. The dry blended composition is slowly introduced into a separate container having 349 grams of water. The exemplary properties are set forth in Table 1 below.

TABLE 1

Properties of the Slurry

| | Slurry No. | | |
|---|---|---|---|
| | 1 | 2 | 3 |
| Water/cement ratio (percent) | 46 | 56 | 44 |
| Hydraulic cement (ASTM C 150 Type) | Type I/II | Type III | Type II/V |
| % Hydraulic Cement | 80 | 80 | 80 |
| % Gypsum | 5 | 5 | 5 |
| % Limestone | 10 | 10 | 10 |
| % Free lime & alkali ions | 5 | 5 | 5 |
| % Organic Component | 0.1 | 0.1 | 0.1 |
| Thickening Time (min) to reach 100 $B_c$ | 90 | 90 | 90 |
| Compressive strength (psi) (113° F., 4000 psi) | | | |
| after 8 (hrs) | 400 | 500 | 450 |
| after 24 (hrs) | 1450 | 3000 | 725 |
| Particle Size Distribution (325 mesh) | 82 | 92 | 78 |
| Blaine (m²/kg) | 320 | 520 | 290 |

What is claimed is:

1. An oil and/or gas well cementitious composition comprising:
   a hydraulic cement;
   a source of free lime and alkali ions;
   a source of calcium carbonate;
   a source of calcium sulfate; and
   an organic component, wherein when the composition is mixed with water, the composition has a minimum thickening time of at least about 90 minutes and an eight-hour compressive strength of at least about 200 psi (about 1.4 MPa).

2. The composition of claim 1, wherein the hydraulic cement is present in an amount of greater than or equal to about 50% by weight of the composition.

3. The composition of claim 1, wherein the source of free lime and alkali ions is present in an amount of less than about 25% by weight of the composition.

4. The composition of claim 1, wherein the source of free lime and alkali ions comprises cement kiln dust.

5. The composition of claim 1, wherein the organic component is present in the composition in an amount of less than or equal to about 3% by weight of the composition.

6. The composition of claim 1, wherein the organic component comprises one or more of: polyhydric alcohols, alkanolamines, amine acetates, salts and equivalents thereof.

7. The composition of claim 1, wherein the source of calcium carbonate is present in an amount of about 3 to about 25% by weight of the composition.

8. The composition of claim 1, wherein the source of calcium carbonate comprises one or more of: calcium carbonate, limestone, dolomite, calcite and aragonite.

9. The composition of claim 1, wherein the source of calcium carbonate comprises limestone.

10. The composition of claim 1, wherein the source of calcium sulfate is present in an amount of about 3 to about 10% by weight of the composition.

11. The composition of claim 1, wherein the source of calcium sulfate comprises gypsum.

12. The composition of claim 1, wherein the hydraulic cement comprises one or more of Portland cements of Type I, Type II, Type III and Type V, modified Portland cements, performance hydraulic cement, blended hydraulic cements and alumina cements.

13. The composition of claim 1, wherein the cementitious composition has a Blaine surface area of greater than about 220 m²/kg.

14. The composition of claim 1, wherein the cementitious composition has greater than or equal to about 65% passing on a 325 mesh screen.

15. The composition of claim 1, wherein the composition comprises:
   about 50% to about 90% by weight of the composition of the hydraulic cement,
   about 1% to about 25% by weight of the composition of the free lime and alkali ions;
   about 3% to about 25% by weight of the composition of the calcium carbonate;
   about 3% to about 10% by weight of the composition of the calcium sulfate; and
   less than or equal to about 3% of the organic component.

16. A wellbore cementitious composition comprising:
   a hydraulic cement present at greater than or equal to about 50% by weight of the composition;
   a source of free lime and alkali ions present at greater than or equal to about 1% by weight of the composition;
   a source of calcium carbonate present at greater than or equal to about 3% by weight of the composition;
   a source of calcium sulfate present at greater than or equal to about 3% by weight of the composition; and
   an organic component present at less than or equal to about 3% by weight of the composition.

17. The composition of claim 16, wherein the hydraulic cement comprises Portland cement, the source of free lime and alkali ions comprises cement kiln dust; the source of calcium carbonate comprises one or more of: calcium carbonate, limestone, dolomite, calcite and aragonite; the source of calcium sulfate comprises gypsum; and the organic component comprises one or more of: polyhydric alcohols, alkanolamines, amine acetates, salts and equivalents thereof.

18. The composition of claim 16, wherein the cementitious composition has a Blaine surface area of greater than or equal to about 220 m²/kg.

19. The composition of claim 16, wherein the cementitious composition has greater than or equal to about 65% passing on a 325 mesh screen.

20. The composition of claim 16, wherein in the presence of water, the cementitious composition forms a slurry that has a minimum thickening time of about 90 minutes and wherein the cementitious composition forms a solid set cement that has an eight-hour compressive strength of about 200 psi (about 1.4 MPa) to about 4,400 psi (about 30 MPa).

21. The composition of claim 16, wherein the hydraulic cement is present at about 50% to about 90% by weight of the composition, the source of free lime and alkali ions is present at about 1% to about 25% by weight of the composition and the source of free lime and alkali ions comprises cement kiln dust, the source of calcium carbonate is present at about 3% to about 25% by weight of the composition, the source of calcium sulfate is present at about 3% to about 10% by weight of the composition, and the organic component is present at less than or equal to about 3% by weight of the composition.

22. A wellbore cementitious composition comprising:
a hydraulic cement present at about 50% to about 90% by weight of the composition, wherein the hydraulic cement comprises Portland cement;
a source of free lime and alkali ions present at about 1% to about 25% by weight of the composition, wherein the source of free lime and alkali ions comprises cement kiln dust;
a source of calcium carbonate present at about 3% to about 25% by weight of the composition, wherein the source of calcium carbonate comprises limestone;
a source of calcium sulfate present at about 3% to about 10% by weight of the composition, wherein the source of calcium sulfate comprises gypsum; and
an organic component present at less than or equal to about 3% by weight of the composition.

23. The composition of claim 21, wherein in the presence of water, the cementitious composition forms a slurry that has a minimum thickening time of about 90 minutes and wherein the cementitious composition forms a solid set cement that has an eight-hour compressive strength of about 200 psi (about 1.4 MPa) to about 4,400 psi (about 30 MPa).

\* \* \* \* \*